Sept. 26, 1950        O. VOGEL        2,523,458
VALVE WHEEL MARKER
Filed May 12, 1947
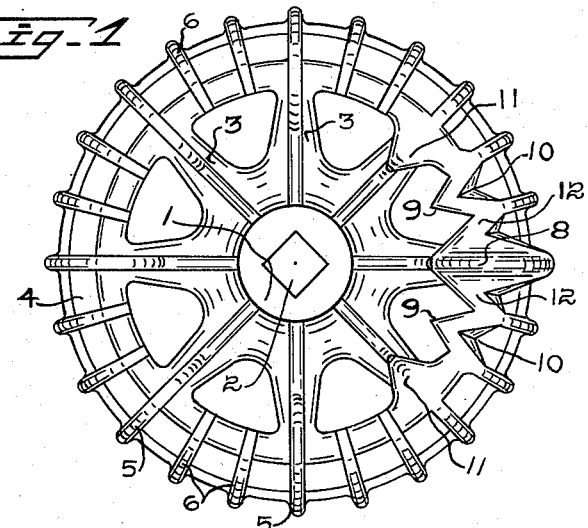
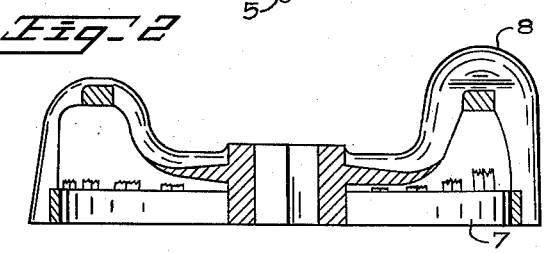
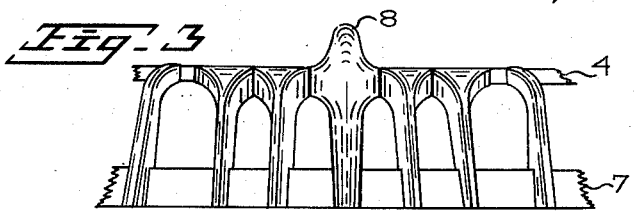
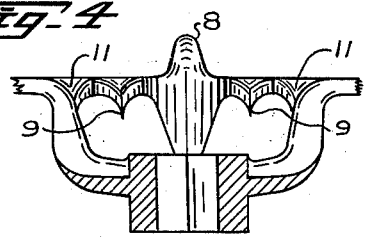
Inventor
Ole Vogel
Per L. J. Mitchell
Attorney Patented Sept. 26, 1950

2,523,458

UNITED STATES PATENT OFFICE 2,523,458

VALVE WHEEL MARKER

Ole Vogel, Moose Jaw, Saskatchewan, Canada

Application May 12, 1947, Serial No. 747,552

2 Claims. (Cl. 74—553)

My invention relates to valve wheel markers, having particular reference to improved indicating means by which the relative position of the wheel may be conveniently ascertained.

In the art to which the invention relates it is very desirable to be able to determine the position of a valve wheel by either feel or sight, and to do it quickly. The present invention contemplates an improved indicator for valve wheels by which the position of the wheel may be determined by feel, or which may be easily seen.

One of the objects of the invention is accordingly to provide an improved valve wheel by addition of a marker to the wheel that may be easily felt by an operator and that is also plainly discernible on the wheel.

A further object of the invention is to provide in a valve wheel a group of markers by which the amount a wheel is turned may be readily determined.

Other features and advantages of the invention will become apparent by reference to the accompanying description taken in conjunction with the drawings wherein like characters of reference indicate like parts throughout the different views and wherein—

Fig. 1 is a plan view of a wheel embodying my improvements.

Fig. 2 is a side view of the wheel shown partly broken away.

Fig. 3 is a detail side view of a fragment of the wheel showing particularly the marker as viewed from the side.

Fig. 4 is a detail fragment of the wheel showing the indicating parts as viewed from inside the wheel.

Having reference to the drawings there is provided a valve wheel having the usual spindle receiving body portion 1 with opening 2 for mounting on a valve spindle. From the body 1 radiate arms 3 terminating in an annular rim section 4 with ridges at intervals serving as marking indicators.

These include eight main ridges 5 radiating from the center, with protruding indented portions 6, there being in the present showing twenty-four ridges in all, and this of course may be varied, such an arrangement being common in the art. There is further provided an integral plate 7 forming the base of the structure.

For the purpose of the present invention I form one of the ridges enlarged to provide a marker 8 that projects above the remaining ridges sufficiently to be readily discernible, and to be easily felt to determine the position of the valve.

The third ridge on each side of the marker 8 is enlarged, as indicated at 11, to provide a knob distinguishable from the marker 8 and capable of being seen or felt. Intermediate the knobs 11 and marker 8 are inwardly directed V-shaped projections 9, with a V-shaped indentation 10 opposite thereto, and a further similar indentation 12 between the marker 8 and the first ridge on each side of the marker.

This gives a main indicating marker with secondary markers provided by the knobs 11, and for finer adjustment the intermediate projections and indentations are provided.

By this means main and secondary marking indicators are provided that may be felt or seen and permit a fine degree of adjustment of the valve wheel as is necessary in certain instances. The marker is a great convenience in hand operated valves, particularly under adverse conditions.

While I have herein disclosed a preferred embodiment of my invention, it is aobvious that changes in construction of the valve wheel would be permissible within the spirit and scope of the invention as defined in the appended claims, and such changes would be considered a part hereof.

What I claim and wish to secure by Letters Patent is:

1. A valve wheel providing a hub and a series of main ridges radiating from the hub to the peripheral portion of the wheel and a plurality of secondary ridges between the main ridges, one of said main ridges having an enlarged upstanding peripheral portion and distinctive protuberances on either side of the enlarged main ridge projecting inwardly from the peripheral portion of the wheel.

2. A valve wheel providing a hub and a series of main ridges radiating from the hub to the peripheral portion of the wheel and a plurality of secondary ridges between the main ridges, one of said main ridges having an enlarged upstanding peripheral portion, and protuberances on either side of the enlarged main ridge projecting inwardly from the peripheral portion of the wheel, and further including indentations outwardly of and in radial alignment with the protuberances, and further indentations between the first mentioned indentations and the enlarged main ridge of the wheel equidistant therebetween.

OLE VOGEL.

REFERENCES CITED

The following references are of record in the file of this patent:

UNITED STATES PATENTS

| Number | Name | Date |
| --- | --- | --- |
| 1,569,539 | Desjardins | Jan. 12, 1926 |
| 1,648,260 | Cashin et al. | Nov. 8, 1927 |
| 1,660,423 | McKinley | Feb. 28, 1928 |
| 2,031,932 | Cornell | Feb. 25, 1936 |
| 2,082,091 | Adams | June 1, 1937 |
| 2,101,356 | Zok | Dec. 7, 1937 |

FOREIGN PATENTS

| Number | Country | Date |
| --- | --- | --- |
| 323,922 | Great Britain | Jan. 16, 1930 |
| 110,790 | Australia | June 20, 1940 |